United States Patent [19]
Matheny

[11] Patent Number: 5,321,584
[45] Date of Patent: Jun. 14, 1994

[54] BATTERY AND HOLDER ASSEMBLY FOR USE WITH A BATTERY OPERATED TOUCH PEN

[75] Inventor: Mark Matheny, Manchester, Conn.

[73] Assignee: Tek Electronics Manufacturing Corporation, Manchester, Conn.

[21] Appl. No.: 6,265

[22] Filed: Jan. 19, 1993

[51] Int. Cl.⁵ .................. H05K 5/02; G08C 21/00; H01M 2/10
[52] U.S. Cl. .................. 361/752; 361/759; 178/18; 429/96
[58] Field of Search .............. 178/18; 382/3; 429/96–100; 361/752, 759

[56] References Cited

U.S. PATENT DOCUMENTS

| | | | |
|---|---|---|---|
| 4,883,926 | 11/1989 | Baldwin | 178/18 |
| 5,107,541 | 4/1992 | Hilton | 382/3 |
| 5,122,427 | 6/1992 | Flowers et al. | 429/97 |
| 5,247,137 | 9/1993 | Epperson | 178/18 |

Primary Examiner—Leo P. Picard
Assistant Examiner—Michael W. Phillips
Attorney, Agent, or Firm—McCormick, Paulding & Huber

[57] ABSTRACT

An assembly for holding a battery and touch port is releasably engageable with a touch pen body in a battery operated touch pen. The battery is releasably held in compression by a spring between two wafer circuit boards which in turn are electrically and physically connected by conductors disposed opposite one another. The conductors respectively carry a voltage potential and data signals from the touch port to axially facing circuit paths. Compression pins carried by the touch pen body having axially extending contact heads are urged into contact with the respective axially facing circuit paths when the assembly is attached to the touch pen body to supply voltage and data signals to electronic circuitry and memory devices carried by the touch pen body.

4 Claims, 1 Drawing Sheet

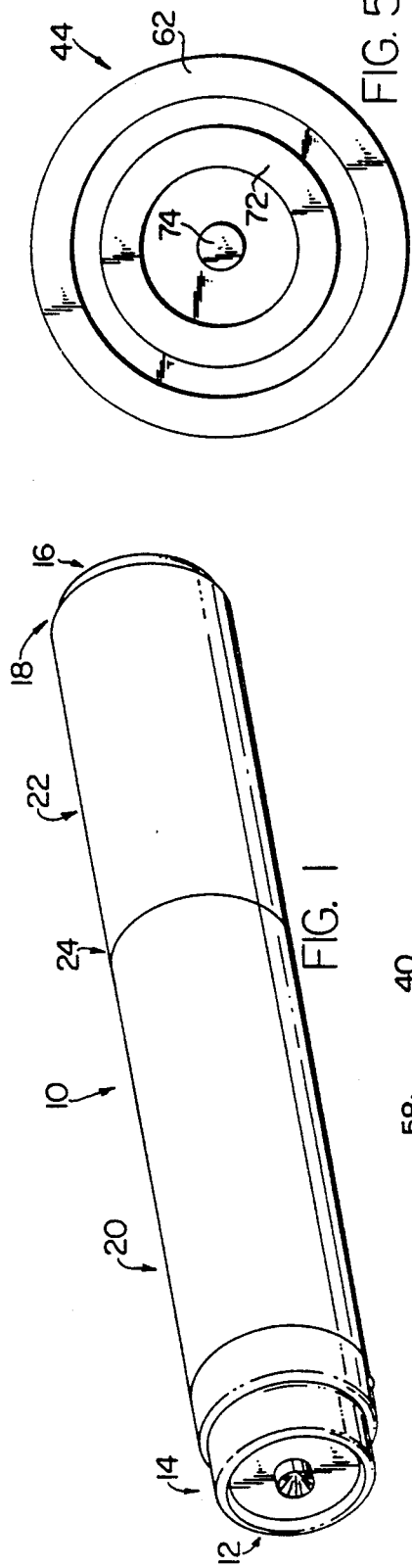
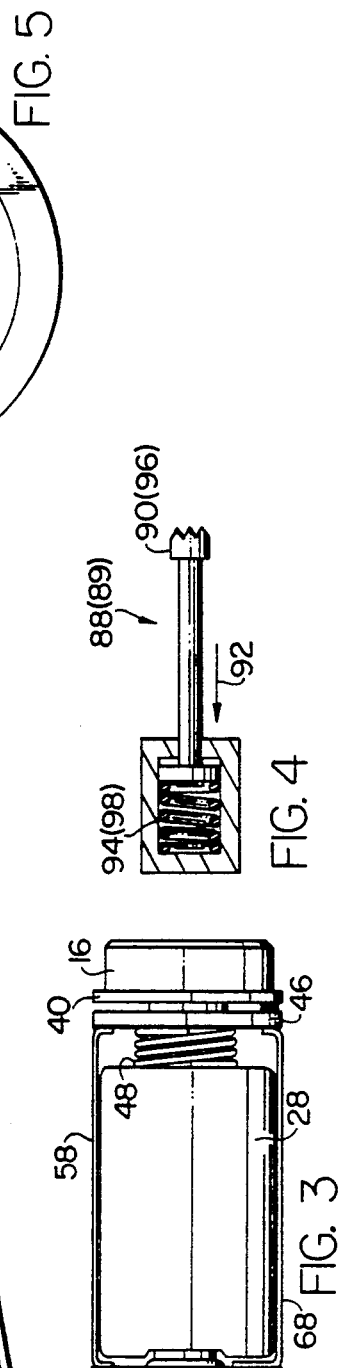
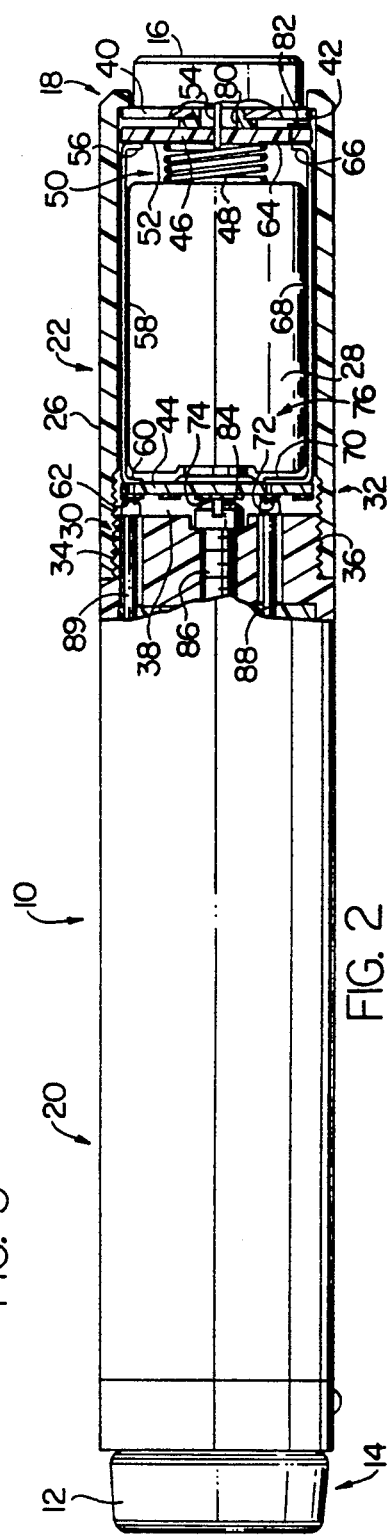

BATTERY AND HOLDER ASSEMBLY FOR USE WITH A BATTERY OPERATED TOUCH PEN

BACKGROUND OF THE INVENTION

The present invention relates generally to touch pens and deals more particularly with a replaceable battery and holder assembly for use with a battery operated touch pen.

Touch pens are known in the art and are of the general type having a touch port serial data device for reading data from a touch memory device and which data is stored in a non-volatile memory in the touch pen. Data is read to the memory via a touch probe serial data device coupled to the memory and also carried by the touch pen. Typically, data is read from a touch memory device which may contain various different types of information, for example, inventory information, identification information, security information and the like and which information is dynamic and changing or which information may be portable from one location to another. The touch pen provides an efficient and convenient way to keep track of such information and transfer it to a central location to update the information at the central location, for example, a computer which may be used for inventory control or processing. Various applications of the touch pen are known in the art and one may refer to trade literature for a more detailed explanation of the operation of a touch pen and exemplary applications.

One drawback associated with battery operated touch pens of the above general type is that the touch pen must be returned to a maintenance or repair group for disassembly and removal of the battery from the touch pen, generally by unsoldering the battery connections and installing and resoldering a fresh battery. The obvious disadvantage is that the touch pen is removed from service during the time that the battery is replaced and data, which may be time sensitive, contained within the touch pen memory cannot be transferred, updated or otherwise used thereby possibly delaying other operations dependent upon the data stored in the touch pen.

Another disadvantage is that the battery must be replaced by a person having skill and knowledge of electronic components, soldering techniques, and so forth. In addition, such handling may affect the data stored in the touch pen.

It would be desirable therefore to have a battery powered touch pen with the capability to have its battery supply replaced easily and simply without the time consuming and labor intensive effort now required to replace such a battery.

It would also be desirable to replace a battery in a touch pen without the "downtime" generally associated with battery replacement in known touch pens so that data contained within the touch pen memory can be readably and timely transferred, updated, or otherwise used in the normal manner without introducing delay into an operation with which the data of the touch pen is used.

It is an aim of the present invention therefore to provide a touch pen having a replaceable battery and holder assembly which overcomes the above mentioned disadvantages and shortcomings of known touch pens.

SUMMARY OF THE INVENTION

In accordance with the present invention, a battery and touch port holder assembly for use with a battery powered touch pen is presented. The battery is held in compression between two wafer circuit boards by the biasing action of a spring urging the battery in one direction against one wafer circuit board and the second wafer circuit board in the opposite direction. Braided electrical conductors are diametrically disposed opposite one another and extend between and maintain the two wafers circuit boards in a fixed spaced relation with respect to one another when the battery is inserted therebetween and which conductors also carry a voltage potential and data signal, respectively. The battery and touch port holder assembly are carried within a cylindrically shaped chamber formed in a releasably attached end portion of the touch pen which is engageable with the touch pen body.

Foil circuit paths carried on the wafer printed circuit board closest to the touch pen body provide outwardly, axially facing contact surfaces for battery and ground voltage reference potentials and data signals from the touch port. Compression pins having axially extending heads are carried by the touch pen body and contact the respective foil paths of the wafer printed circuit board when the releasably attached end portion carrying the holder assembly is engaged with the touch pen body. The heads of the compression pins are urged into contact with the foil circuit paths to provide reliable contact and to take up dimensional tolerances that may exist between different units.

BRIEF DESCRIPTION OF THE DRAWINGS

Other features and advantages of the present invention will become readily apparent from the following written description and drawings wherein:

FIG. 1 is a perspective view of a battery powered touch pen embodying the present invention.

FIG. 2 is a partially cut away, cross-sectional view of the battery powered touch pen of FIG. 1 revealing the battery and touch port holder assembly and electrical contacts between the assembly and electrical circuitry in the touch pen body.

FIG. 3 illustrates the battery and touch port holder assembly removed from the battery and touch port holder assembly housing.

FIG. 4 illustrates schematically and partially cutaway the compressible pins carried by the touch pen body to electrically and physically contact the axially facing foil paths carried by the wafer circuit board of the assembly.

FIG. 5 is a plan view of the wafer circuit board showing the foil circuit paths.

WRITTEN DESCRIPTION OF PREFERRED EMBODIMENTS

Turning now to the drawings and considering the invention in further detail, a battery operated touch pen of the general type with which the present invention may be practiced is shown in perspective view in FIG. 1 and generally designated 10. The touch pen 10 is generally tubular, pen-shaped and includes a touch probe 12 at one end 14 and a touch port 16 at its opposite end 18. The touch pen 10 further includes a touch body generally designated 20 and a releasable engageable battery and touch port holder assembly housing 22. The battery holder assembly 22 is releasably engageable with the touch pen body 20 by means of snap engagement, twist-lock or threadably screwing the assembly to the body. In the illustrated embodiment of FIG. 1, the battery holder assembly 22 is threadably attached to the touch pen body 20 at the annular ring attachment band generally designated 24.

Turning now to FIG. 2, the battery and touch port holder assembly and electrical connection to the touch pen body is shown in greater detail. The battery and touch port holder assembly 22 includes a cylindrically shaped housing 26 for receiving the battery 28 and touch port 16. As illustrated, the housing 26 includes threads generally designated 30 along the inner peripheral surface of the housing 26 at one end 32. The threads 30 are threadably engageable with complementary threads 34 located on the outer peripheral surface 36 of the touch pen body 20. As more clearly illustrated in FIG. 3, the battery 28 and touch port 16 are received within an inwardly open cylindrical chamber generally designated 38 within the housing 26. The housing 26 has an opening at the end 18 to receive in complementary engagement an annular flange 40 of the touch port with the flange 40 being in contact with an annular lip 42 formed in the housing 26 at the end 18 to prevent the battery and touch port holder assembly 22 from being pushed out of the housing 26.

As illustrated in FIG. 2, the battery 28 is held in a spring biased relationship between a circular wafer printed circuit board 44 at the one end 76 of the battery nearest the touch pen body and a second circular printed wafer circuit board 46 at the opposite end 50 of the battery furthest from the touch pen body with a spring 48 being located between the circuit board 46 and the end 50 of the battery 28. The circular wafer board 46 includes a foil circuit path 52 to electrically couple the data lead 54 of the touch port 16 to one end 56 of a braided conductor 58. The opposite end 60 of the braided conductor 58 is connected to the wafer circuit board 44 and a foil circuit path 62 carried on the circuit board 44 to provide a means of electronic connection to circuitry carried by the touch pen body as disclosed in further detail below. The spring 48 and flange 40 of the touch port 16 are connected to a foil circuit path 64 located on the surface of the wafer circuit board 46. One end 66 of a braided wire conductor 68 is electrically and physically coupled to the circuit path 64 and the circuit board 46 diametrically opposite the end 56 of the braided conductor 58. The opposite end 70 of the braided conductor 68 is physically connected to the circuit board 44 and electrically to a foil circuit path 72 located on the surface of the printed circuit board 44 to provide an electrical connection to the touch pen body as described in further detail below. A third foil circuit path 74 is carried on the surface of the wafer circuit board 44 and provides an electrical connection for the one end 76 of the battery 28 to provide a source of power to the touch pen body as described below.

In the illustrated embodiment, the spring 48 is in biasing contact with the opposite end 50 of the battery 28 urging the battery toward the wafer circuit board 44 and causes the braided conductors 58 and 68, respectively to be in tension thereby maintaining the battery 28 in physical and electrical connection between the respective wafer circuit boards 44 and 46. It will be seen that the battery 28 can be released and a replacement battery inserted by compressing the spring 48.

An annular insulator 80 through which the data lead 54 passes is inserted between the flange 40 of the touch port 16 and the wafer circuit board 46 to maintain a physical separation and electrical insulation between the data lead 54 and the flange 40. The flange 40 is electrically and physically coupled to the foil path 64 which is electrically connected to the spring 48 by means of a foil conductor 82 having one respective end attached to the flange 40 and an opposite end to the foil circuit path 64 which is carried on the surface of the wafer printed circuit board 46.

Electrical contact is made between circuitry carried within the touch pen body 20 and the battery and touch port holder assembly 22 by means of the foil circuit paths 62, 72 and 74 respectively carried on the surface of the wafer circuit board 44 and which paths are brought into physical and electrical contact with respective electrical connections carried by the touch pen body 20. As illustrated in FIG. 2, one voltage polarity of the battery 28 is supplied to the electrical circuitry through contact of a screw head 84 of an axial screw 86 carried by the touch pen body 20. The head 84 of the screw 86 is in physical and electrical contact with the foil path 74 and electrically to the battery when the holder assembly 22 is threadably engaged with the touch pen body. The arrangement insures a viable electrical contact between the screw head 84 and the foil path 74 as a result of the force of the spring 48 urging the battery and the foil 74 into engagement with the screw head 84.

The opposite voltage polarity of the battery 28 carried by the electrical conductor 64 is supplied to the electrical circuitry carried by the touch pen 20 by means of a compressible pin 88 carried by the touch pen body. The compressible pin 88, as illustrated in detail in FIG. 4, includes an axially extending head 90 which is movable in the direction indicated by arrow 92 to compress a spring 94 which biases the head 90 outward into engagement with the foil circuit path 72 when the holder assembly is engaged with the touch pen body 20. The data signals from and to the touch port memory device carried by the electrical conductor 58 is supplied to the electrical circuitry carried by the touch pen 20 by means of a compressible pin 89 carried by the touch pen body. The compressible pin 89 is substantially identical to the compressible pin 88 and includes an axially extending head 96 which is movable in the axial direction to compress a spring 98 which biases the head 96 outward into engagement with the foil circuit path 62 when the holder assembly is engaged with the touch pen body 20.

A good and reliable electrical contact is also made with the circuit paths 62 and 72 by the respective heads 90, 96 of the compression pins which heads push in the opposing direction from the direction of force exerted by the spring 48 thus insuring contact with the respective circuit paths when the holder assembly 22 is screwed onto the touch pen body 20. It will also be appreciated and recognized that in the present arrangement with the heads of the compression pins being biased axially toward the wafer printed circuit board 44 when the holder assembly 22 is threadably engaged to the touch pen body 20 and with the foil path 74 being urged into engagement with the screw head 84 by the spring 48, a viable electrical connection is ensured and maintained. One feature and advantage of the present arrangement is that the battery and touch port holder assembly 22 can be utilized with any number of different touch pen bodies since any tolerance differences between units are taken up and compensated for by the combined action of the axially biased heads of the compression pins and the biasing on the wafer circuit board 44.

As illustrated in FIG. 5, the foil circuit paths 62, 72 and 74 carried by the circular wafer printed circuit board 44 are concentric and present an outwardly, axially facing contact surface to the contact heads 90,96 of the compression pins and to the screw head 84, respectively. The concentric circuit paths are radially spaced and offset from one another in a predetermined spacing arrangement coincident with the spacing arrangement of the compression pins carried by the touch pen body 20. In the preferred embodiment, the outer foil circuit path 72 carries the ground voltage reference potential from the battery 28; foil circuit path 62 carries the data signals from the data lead 54, and foil circuit path 74 carries the positive voltage reference potential from the battery 28.

A touch pen having a battery and touch port holder assembly to provide an expeditious and easy method to replace the battery used in a touch pen has been described above. It will be recognized by those skilled in the art that numerous changes and modifications may be made to the above described embodiment without departing from the spirit and scope of the invention and therefore the invention has been described by way of illustration rather than limitation.

I claim:

1. A battery powered touch pen of the general type having an axially elongated body and a touch probe at one end for collecting data from at least one touch memory device, a non-volatile memory device means for storing the data, means for reading and writing data to the memory device means and a touch port at a second end opposite said first end for transferring data from said memory device means to at least one touch memory device, said touch pen comprising:

a battery holder assembly having means for carrying a battery and the touch port and being releasably engaged with one end of the touch pen body for providing:

an electrical circuit contact between the battery carried by said holder and the electrical circuitry carried by the touch pen body whereby a voltage potential is supplied to the electrical circuitry;

a first data logic contact between the touch port and the electrical circuitry carried by the touch pen body;

said battery holder assembly further having an axially elongated end portion having means for releasably engaging one end of said axially elongated touch pen body, said end portion having an inwardly open internal chamber for receiving and holding a battery, and further including means for holding said touch port in axial alignment with said end portion;

printed circuit board means having a surface for carrying at least three foil circuit paths and being disposed and carried by said battery holder at said inwardly open end, said battery being releasably held in a sandwiched relationship between said touch port and said printed circuit board and being electrically coupled to predetermined of said foil paths on said printed circuit board to provide a predetermined voltage polarity between said predetermined foil paths, said printed circuit board being carried so that said foil paths provide an outwardly, axially facing contact surface;

first electrical contact means located at said one end of the touch pen body and extending axially outward therefrom and in registration with a first predetermined one of said foil paths carried by said printed circuit board to make a physical and electrical contact therewith when said battery holder assembly is in engagement with said one end of the touch pen body;

second electrical contact means located at said one end of the touch pen body and extending axially outward therefrom and in registration with a second predetermined one of said foil paths carried by said printed circuit board to make a physical and electrical contact therewith when said battery holder assembly is in engagement with said one end of the touch pen body, said second electrical contact means being in a predefined spaced radial relationship with respect to said first electrical contact means;

third electrical contact means coaxially located with and at said one end of the touch pen body and in registration with a third predetermined one of said foil paths carried by the printed circuit board to make physical and electrical contact therewith when said battery holder assembly is in engagement with said one end of the touch pen body.

2. A battery powered touch pen as defined in claim 1 wherein said first electrical contact means further comprises a first compression pin having a contact head slidingly carried by an axial body and spring means for urging said contact head axially outward.

3. A battery powered touch pen as defined in claim 2 wherein said second electrical contact means further comprises a second compression pin having a contact head slidingly carried by a second axial body and second spring means for urging said contact head axially outward.

4. A battery powered touch pen as defined in claim 1 wherein said battery holder assembly is threadably engaged with said touch pen body.

* * * * *